J., F. W. & E W. SHORTRIDGE.
WATER-WHEEL.
No. 176,247.
Patented April 18, 1876.
Fig: 1.
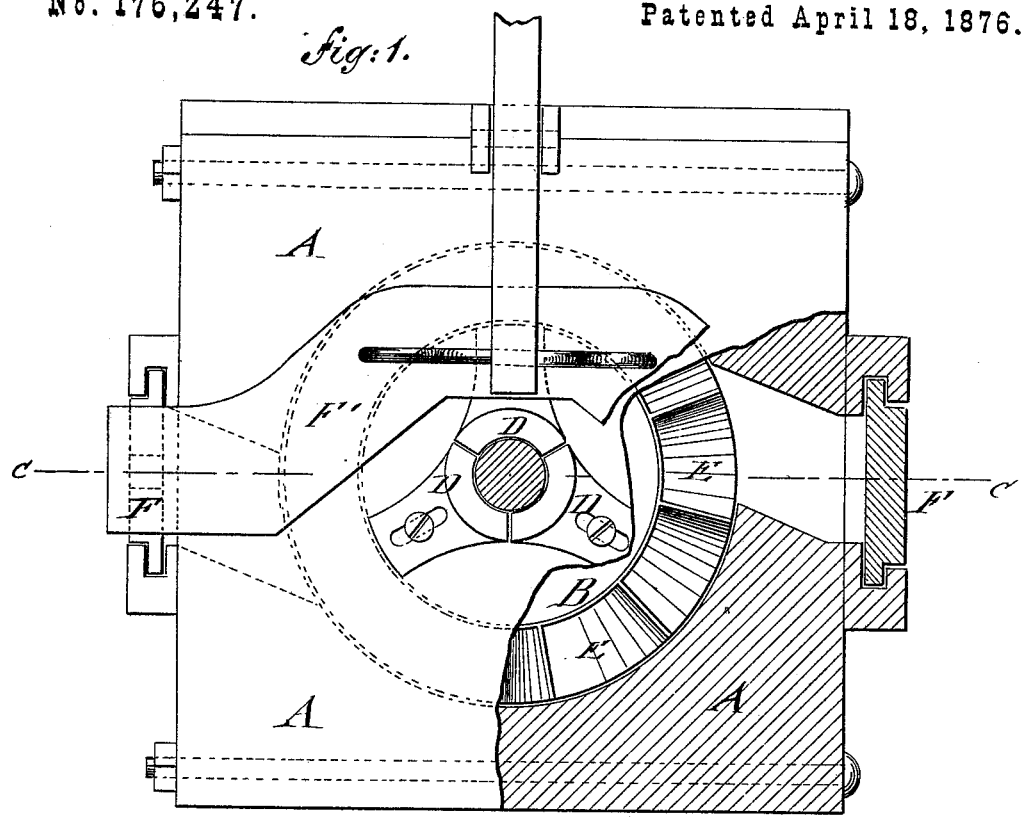
Fig: 2.
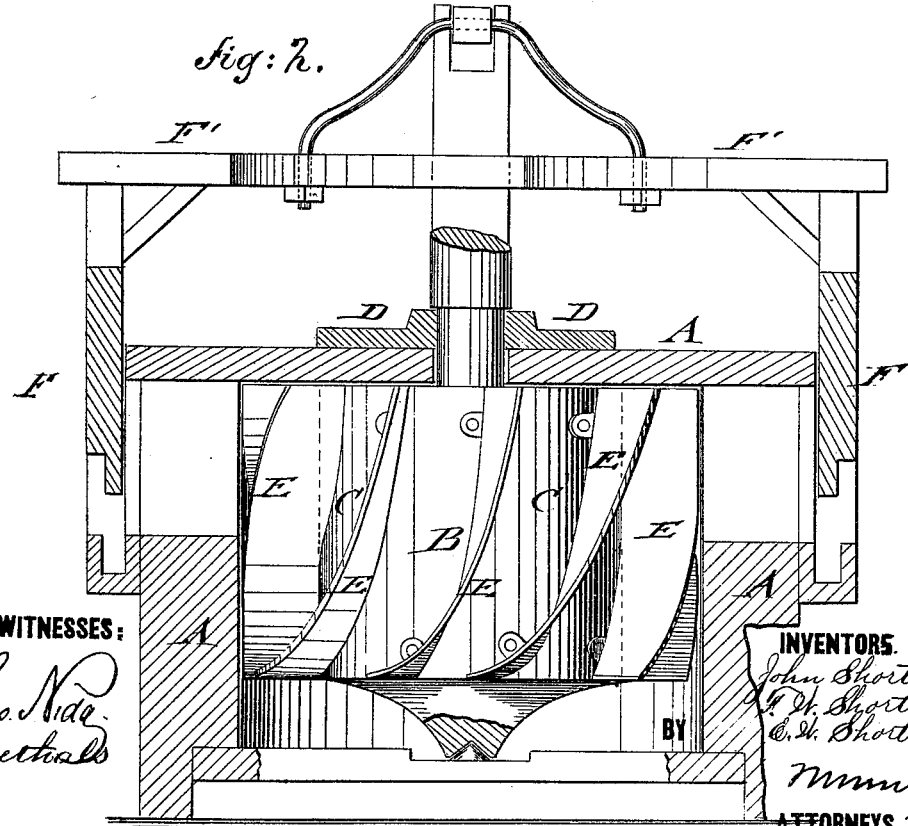
WITNESSES:
INVENTORS.
John Shortridge
F. W. Shortridge
E. W. Shortridge
BY
ATTORNEYS.

UNITED STATES PATENT OFFICE.

JOHN SHORTRIDGE, FRANK W. SHORTRIDGE, AND ERNEST W. SHORTRIDGE, OF ROCKINGHAM, NORTH CAROLINA.

IMPROVEMENT IN WATER-WHEELS.

Specification forming part of Letters Patent No. 176,247, dated April 18, 1876; application filed February 5, 1876.

*To all whom it may concern:*

Be it known that we, JOHN SHORTRIDGE, FRANK W. SHORTRIDGE, and ERNEST W. SHORTRIDGE, of Rockingham, in the county of Richmond and State of North Carolina, have invented a new and Improved Water-Wheel, of which the following is a specification:

In the accompanying drawing, Figure 1 represents a top view, with part cut off, of our improved water-wheel; and Fig. 2 is a vertical transverse section of the same on line $c\ c$, Fig. 1.

Similar letters of reference indicate corresponding parts.

The invention consists in providing a water-wheel with tapering bottom parts below the bottom edge of buckets, to rest on turning-point, and form escape-box below the wheel, as hereinafter described.

In the drawing, A represents a casing, preferably made of wood, with the sides, top, and bottom firmly bolted together, to form a tight inclosure for the wheel. The interior of the box is cylindrical and adapted to the wheel B, which is constructed of a solid hub, C, of inverted conical or cylindrical shape, hung by a shoulder of its shaft to a journal-box, D, at the top of the casing. The journal-box D is made of sliding sections, as shown in Fig. 1, which are set close to the shaft to keep the same in vertical position, and also exclude the water. The bottom part of the hub C is of tapering, conical, or curved shape, and fitted to a central conical bearing-point, to produce as small a friction as possible.

The buckets E are made of spirally-twisted shape, preferably of cast-iron, and secured by lugs and bolts to the hub. The outer edge of the buckets is cylindrical, to conform to the interior shape of the casing. The lower part of the buckets E is made with increased curvature, forming at the lower part narrower exit-openings than at the top, so that the water lies with full weight on the buckets before leaving them, and exercises considerable back action thereon.

The bottom part of the casing forms a space or escape-box below the wheel, which enables it to be placed in any flume by securing it to the breast of the same, and making an opening therein for the escape of the water.

The casing A is provided with two side openings at diametrically opposite points, the openings being at the upper half of the casing, and closed by vertically or otherwise sliding gates F, that may be adjusted to different sizes of gates by means of vertical rods and laterally-connecting bar F', hung by a swinging bail to a fulcrumed balance-bar.

Any other mechanism for adjusting the gates may be employed by which they may be readily worked and held in position to admit the required head of water to the wheel.

The entire wheel, with casing, may be readily and economically constructed and set up, and thereby placed within the reach of those that desire to utilize a small water-power at moderate cost.

Having thus described our invention, we claim as new and desire to secure by Letters Patent—

The water-wheel, having tapering bottom part below the bottom edge of buckets, to rest on conical turning-point and form escape-box below the wheel, substantially as described.

JOHN SHORTRIDGE.
FRANK W. SHORTRIDGE.
ERNEST W. SHORTRIDGE.

Witnesses:
ALEX. STEWART,
J. H. AYCOSK.